US008638847B2

(12) United States Patent
Wang (10) Patent No.: US 8,638,847 B2
(45) Date of Patent: *Jan. 28, 2014

(54) VIDEO CODING, DECODING AND HYPOTHETICAL REFERENCE DECODER (75) Inventor: Ye-Kui Wang, Bridgewater, NJ (US)

(73) Assignee: Nokia Corporation, Espoo (FI)

( * ) Notice: Subject to any disclaimer, the term of this patent is extended or adjusted under 35 U.S.C. 154(b) by 488 days.

This patent is subject to a terminal disclaimer.

(21) Appl. No.: 11/720,973

(22) PCT Filed: Dec. 5, 2005

(86) PCT No.: PCT/FI2005/050445
§ 371 (c)(1),
(2), (4) Date: Aug. 26, 2009

(87) PCT Pub. No.: WO2006/061458
PCT Pub. Date: Jun. 15, 2006

(65) Prior Publication Data
US 2010/0034254 A1 Feb. 11, 2010

Related U.S. Application Data (60) Provisional application No. 60/633,827, filed on Dec. 6, 2004.

(51) Int. Cl.
H04N 7/12 (2006.01)
H04N 11/02 (2006.01)

(52) U.S. Cl.
USPC .................. 375/240.01; 375/240.25

(58) Field of Classification Search
USPC ............... 375/240.12, 240.25, 240.01
See application file for complete search history.

(56) References Cited

U.S. PATENT DOCUMENTS

| 6,137,834 | A | 10/2000 | Wine et al. | |
|---|---|---|---|---|
| 2002/0196850 | A1* | 12/2002 | Liu et al. | 375/240.12 |
| 2003/0138043 | A1 | 7/2003 | Hannuksela | |
| 2004/0005007 | A1* | 1/2004 | Viscito et al. | 375/240.25 |
| 2004/0218816 | A1* | 11/2004 | Hannuksela | 382/232 |
| 2005/0117636 | A1 | 6/2005 | Rosenberg et al. | |
| 2006/0120463 | A1* | 6/2006 | Wang | 375/240.25 |

OTHER PUBLICATIONS

3GPP TS 26.234 V6.1.0 (Sep. 2004): "Annex G (normative): Buffering of video", pp. 97-99.
Office Action for U.S. Appl. No. 11/292,752 dated Jun. 29, 2012.
United States Patent and Trademark Office, Office Action for U.S. Appl. No. 11/292,752, Jan. 22, 2013, 13 pages, USA.

* cited by examiner

Primary Examiner — Mark K Zimmerman
Assistant Examiner — Neil R McLean
(74) Attorney, Agent, or Firm — Alston & Bird LLP (57) ABSTRACT An encoder comprising an input for inputting video signal to be encoded to form an encoded video signal comprising pictures of at least a first coded video sequence and a second coded video sequence, a hypothetical decoder for hypothetically decoding encoded video signal, an encoded picture buffer, and a decoded picture buffer, and a definer for defining a parameter indicative of the temporal difference between the last picture of the first coded video sequence and the first picture of the second coded video sequence in output/display order.

18 Claims, 5 Drawing Sheets

| 1 |
|---|
| bit_rate1 |
| cpb_size1 |
| dpb_size1 |
| initial_cpb_removal_delay1 |
| initial_dpb_output_delay1 |
| bit_rate2 |
| cpb_size2 |
| dpb_size2 |
| initial_cpb_removal_delay2 |
| initial_dpb_output_delay2 |

VIDEO CODING, DECODING AND HYPOTHETICAL REFERENCE DECODER

CROSS-REFERENCE TO RELATED APPLICATIONS

This application is the U.S. National Stage of International Application PCT/FI2005/050445 filed Dec. 5, 2005 and claiming priority from U.S. Provisional Application Ser. No. 60/633,827 filed Dec. 6, 2004.

FIELD OF THE INVENTION

The present invention relates to video coding and decoding processes in which a hypothetical reference decoder is implemented. More specifically, the present invention relates to an encoder comprising an input for inputting video signal to be encoded to form an encoded video signal, a decoder, a method, a bitstream, a computer program product and a medium for carrying a bitstream.

BACKGROUND OF THE INVENTION

There are numerous video coding standards including ITU-T H.261, ISO/IEC MPEG-1 Visual, ITU-T H.262 or ISO/IEC MPEG-2 Visual, ITU-T H.263. ISO/IEC MPEG-4 Visual and ITU-T H.264 or ISO/IEC MPEG-4 AVC. H.264/AVC is the work output of a Joint Video Team (JVT) of ITU-T Video Coding Experts Group (VCEG) and ISO/IEC MPEG In addition, there are efforts working towards new video coding standards. One is the development of scalable video coding (SVC) standard in MPEG. This will become MPEG-21 Part 13. The second effort is the development of China video coding standards organized by the China Audio Visual coding Standard Work Group (AVS). AVS has finalized its first video coding specification, AVS 1.0 targeted for SDTV and HDTV applications. Since then the focus has moved to mobile video services. The resulting two standards AVS-M Stage 1 and AVS-M Stage 2 are under development.

Instantaneous Decoding Refresh (IDR) Picture

Instantaneous decoding refresh (IDR) picture was first introduced into H.264, and later was introduced also into AVS-M. IDR pictures are naturally random access points. No subsequent picture can refer to pictures that are earlier than the IDR picture in decoding order. Any picture preceding an IDR picture in decoding order shall also be outputted/displayed earlier than the IDR picture. Each IDR picture leads a coded video sequence that consists of the IDR picture until the next IDR picture in decoding order.

In AVS-M committee draft (CD), there is an 8-bit syntax element picture_distance that indicates the temporal reference of each picture in one coded sequence. The value of picture_distance is equal to the picture_distance value of the previous picture in output/display order plus 1 and plus the number of skipped pictures between the current picture and the previous picture, and then modulo 256. For the first picture of a coded video sequence (IDR picture) the picture_distance value is 0.

Hypothetical Reference Decoder

In video coding standards, a compliant bit stream must be able to be decoded by a hypothetical reference decoder that is conceptually connected to the output of an encoder and consists of at least a pre-decoder buffer, a decoder and an output/display unit. This virtual decoder is known as the hypothetical reference decoder (HRD) in H.263, H.264 and the video buffering verifier (VBV) in MPEG. PSS Annex G, the annex G of the 3GPP packet-switched streaming service standard (3GPP TS 26.234): specifies a server buffering verifier that can also be considered as an HRD, with the difference that it is conceptually connected to the output of a streaming server. The virtual decoder and buffering verifier are collectively called as hypothetical reference decoder (HRD) in this document. A stream is compliant if it can be decoded by the HRD without buffer overflow or underflow. Buffer overflow happens if more bits are to be placed into the buffer when it is full. Buffer underflow happens if some bits are not in the buffer when the bits are to be fetched from the buffer for decoding/playback.

HRD parameters can be used to impose constraints to the encoded sizes of pictures and to assist deciding the required buffer sizes and start-up delay.

In earlier HRD specifications than in PSS Annex G and H.264, only the operation of the pre-decoded buffer (also called as a coded picture buffer, CPB, in H.264) is specified. The HRD in PSS Annex G and H.264HRD also specify the operation of the post-decoder buffer (also called as a decoded picture buffer, DBP, in H.264). Further, earlier HRD specifications enable only one HRD operation point, while the HRD in PSS Annex G and H.264 HRD allows for multiple HRD operation points. Each HRD operation point corresponds to a set of HRD parameter values.

The HRD in PSS Annex G is much simpler than H.264 HRD in terms of two factors, 1) specifications of CPB and DPB operations are much simpler, and 2) no timing information from the bitstream is required. Therefore, from this point of view, it is beneficial to use the HRD in PSS Annex G as the basis of the HRD of a video coding standard.

A shortcoming of the HRD design is that it relies on the presentation time (or capturing time) of each picture provided by external means other than the bitstream itself. However, it may be sometimes necessary or desirable that the bitstream itself could be verified. One solution is to utilize the relative presentation time indicated by the temporal reference information (e.g. picture_distance in AVS-M) provided that the time duration of the temporal reference difference of 1 is also signaled in the bitstream.

There is at least one problem associated with the above-described HRD design based on the HRD in PSS Annex G and the relative presentation time according to the temporal information. That is, if the bitstream consists of more than one coded video sequence, then the relative presentation time of a picture in a coded video sequence other than the first coded video sequence cannot be derived because the temporal reference value is reset to 0 at the beginning IDR picture of each coded video sequence. Therefore, the temporal gap between the last picture of a coded video sequence and the beginning IDR picture of the subsequent coded video sequence in output/display order is unclear. This can make the HRD un-optimal. This problem can become more cumbersome if the bitstream was spliced from different coded video sequences originated differently, for example, when a commercial video clip is inserted into another video bitstream.

SUMMARY OF THE INVENTION

The present invention tries to solve the problem stated above. According to the present invention a parameter indicative of the temporal difference between the last picture (in output/display order) of a coded video sequence and the first picture of a subsequent video sequence is signaled. There are at least two solutions to implement the idea. The first solution is to change the semantics of the syntax element for temporal reference (picture_distance in AVS-M) such that the value of the syntax element continually increases at IDR pictures as if they are non-IDR pictures. The value may reach a maximum value whereafter the value may be set to an initial value, for example to 0 after which the value will again be increased.

The second solution is to signal in the bitstream for each IDR picture the temporal gap between the IDR picture and the previous picture in output/display order. If the IDR picture is the first picture in the bitstream, the value of the temporal gap is set to 0.

According to one aspect of the present invention there is provided an encoder comprising
- an input for inputting video signal to be encoded to form an encoded video signal comprising pictures of a first coded video sequence and a second coded video sequence,
- an encoded picture buffer;
- a decoded picture buffer; and
- a definer for defining at least one parameter indicative of the temporal difference between
  the last picture of said first coded video sequence and the first picture of said second coded video sequence, wherein said at least one parameter is signaled in the encoded video signal.

According to another aspect of the present invention there is provided a bitstream comprising
- an encoded video signal comprising pictures of a first coded video sequence and a second coded video sequence; and
- at least one parameter indicative of the temporal difference between the last picture of said first coded video sequence and the first picture of said second coded video sequence,
- said at least one parameter.

According to a third aspect of the present invention there is provided a decoder comprising
- an input for inputting encoded video signal to be decoded, said encoded video signal comprising
  pictures of a first coded video sequence and a second coded video sequence; and
  at least one parameter indicative of the temporal difference between the last picture of said first coded video sequence and the first picture of said second coded video sequence following said at least one coded video sequence in output/display order.
  said at least one parameter,
- a decoded picture buffer; and
- means for parsing information received in the encoded video signal to obtain said at least one parameter.

According to a fourth aspect of the present invention there is provided a method comprising
- inputting video signal to be encoded to form an encoded video signal comprising pictures of a first coded video sequence and a second coded video sequence;
- defining at least one parameter indicative of the temporal difference between
  the last picture of said first coded video sequence and the first picture of said second coded video sequence, wherein said at least one parameter is signaled in the encoded video signal.

According to a fifth aspect of the present invention there is provided a system comprising
- an encoder comprising
  - an input for inputting video signal to be encoded to form an encoded video signal comprising pictures of a first coded video sequence and a second coded video sequence;
  - an encoded picture buffer;
  - a decoded picture buffer; and
  - a definer for defining at least one parameter indicative of the temporal difference between
    the last picture of said first coded video sequence and the first picture of said second coded video sequence, wherein said at least one parameter is signaled in the encoded video signal;
- a decoder comprising
  - an input for inputting said encoded video signal to be decoded;
  - a decoded picture buffer; and
  - means for parsing information received in the encoded video signal to obtain said at least one parameter.

According to a sixth aspect of the present invention there is provided a software program comprising machine executable instructions for
- inputting video signal to be encoded to form an encoded video signal comprising pictures of a first coded video sequence and a second coded video sequence;
- defining at least one parameter indicative of the temporal difference between
  the last picture of said first coded video sequence and the first picture of said second coded video sequence following said at least one coded video sequence in output/display order
  signaling said at least one parameter in the encoded video stream.

According to a seventh aspect of the present invention there is provided a medium for carrying a bitstream comprising
- an encoded video signal comprising pictures of a first coded video sequence and a second coded video sequence, and
- at least one parameter indicative of the temporal difference between the last picture of said first coded video sequence and the first picture of said second coded video sequence following said at least one coded video sequence in output/display order
- said at least one parameter.

The method can improve the operation of the hypothetical reference decoder and also the end user experience when video stream is decoded by a decoder and presented.

DETAILED DESCRIPTION OF THE INVENTION

Figure 6:
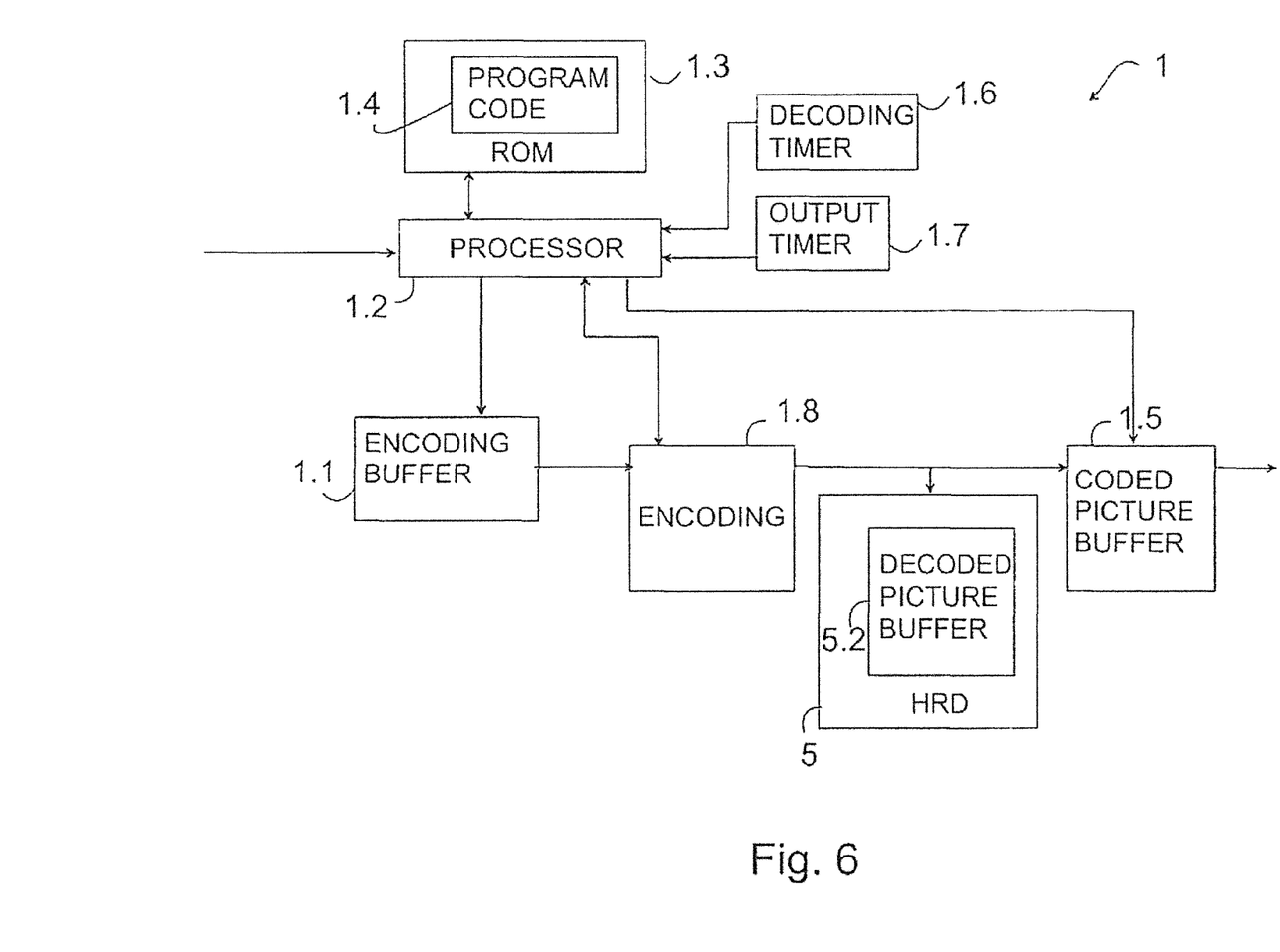
FIG. 6 depicts an example embodiment of the encoder according to the present invention.

The hypothetical reference decoder 5 according to this invention is presented as follows. In FIG. 6 an example embodiment of the encoder 1 comprising the hypothetical reference decoder 5 is depicted as a simplified block diagram.

The buffering model is based on two buffers and two timers. The buffers are called a coded picture buffer 1.5 (CPB) and a decoded picture buffer 5.2 (DPB). The timers are named as a decoding timer 1.6 and an output timer 1.7. The buffering model is presented below.

The coded picture buffer 1.5 and the decoded picture buffer 5.2 are initially empty. Then, encoding element 1.8 which may be implemented e.g. in the processor 1.2 of the encoder, begins to encode the video stream and forms coded pictures. Pictures or parts of the pictures of the video stream, for example reference pictures, may be buffered in the encoding buffer 1.1. The bits of coded pictures are entered to the coded picture buffer 1.5 at the rate equal to a bit_rate parameter. The decoding timer 1.6 is initiated to a negative value equal to (0−initial_cpb_removal_delay) and the decoding timer 1.6 is started when the first bit enters the coded picture buffer 1.5. Data is not removed from the coded picture buffer 1.5 if the value of the decoding timer 1.6 is smaller than 0. Removal of a coded picture from the coded picture buffer 1.5 is started when the previous coded picture has been entirely removed from the coded picture buffer 1.5. Alternatively, removal of a coded picture from the coded picture buffer 1.5 is started when both of the following two conditions are met: First, the value of the decoding timer 1.6 is equal to the relative output time of the picture. Second, the previous coded picture has been entirely removed from the coded picture buffer 1.5.

The duration of coded picture removal is equal to the number of macroblocks in the coded picture divided by the peak decoding macroblock rate. Alternatively, the duration of coded picture removal is the larger one of the following two values: The first value is equal to the number of macroblocks in the coded picture divided by the peak decoding macroblock rate. The second value is equal to the number of bytes in the coded picture divided by the peak decoding byte rate. When the coded picture has been removed from the coded picture buffer 1.1 entirely, the corresponding decoded picture is put into the decoded picture buffer 5.2. The peak decoding macroblock rate is the maximum decoding speed, in units of a macroblock per second, needed to decode the bitstream. The peak decoding byte rate is the maximum decoding speed in units of bytes per second needed to decode the bitstream. The peak decoding macroblock rate and the peak decoding byte rate are specified in level definitions and they may vary in a video bitstream, either from a picture to a picture, of from a group of pictures to another group of pictures.

The output timer 1.7 is initiated to a negative value equal to (0−initial_dpb_out_delay) and started when the first decoded picture enters the decoded picture buffer 5.2. Data is not outputted from the decoded picture buffer 5.2 if the value of the output timer 1.7 is smaller than 0. A decoded picture is outputted from the decoded picture buffer 5.2 substantially immediately when the value of the output timer 1.7 is equal to the relative output time of the picture. If the decoded picture is a non-reference picture or if the decoded picture is a reference picture but is marked as "unused for reference", the data of the decoded picture is also removed from the DPB when it is outputted. When outputting a decoded picture from the DPB, decoded pictures that are marked as "unused for reference" and the relative output times are earlier than the output timer are removed from the DPB. The marking of a reference picture as "used for reference" or "unused for reference" should be specified by the standard.

The buffering model may be initialized at any picture that is associated with a set of HRD parameters.

Requirements for a Compliant Bitstream

A transmitted or stored compliant bitstream shall fulfill the following requirements when the HRD is operated at any of the signaled operation points.

The coded picture buffer (CPB) and decoded picture buffer (DPB) shall never overflow. In other words, the occupancy of the coded picture buffer shall not exceed the default or signalled buffer size, and, respectively, the occupancy of the decoded picture buffer shall not exceed the default or signalled buffer size.

The decoded picture buffer shall never underflow i.e. each decoded picture shall be inserted into the decoded picture buffer before or at its relative output time.

Requirements for a Compliant Decoder

A compliant decoder shall fulfill the following requirements:

A decoder claiming conformance to a specific profile and level shall be able to decode successfully all conforming bitstreams.

A decoder shall be capable of receiving and decoding all the pictures in a compliant bit-stream when the same buffer sizes are assumed both in the decoder and in the bit-stream. Furthermore, the decoder shall be capable of passing each picture to a display/output process at the same time when the hypothetical reference decoder would virtually display/output the picture.

In an example embodiment the following parameters are defined for the operation of the hypothetical reference decoder 5: cpb_dpb_cnt_minus1, bit_rate, cpb_size, dpb_size, initial_cpb_removal_delay and initial_dpb_output_delay.

There can be more than one alternative coded picture buffer and decoded picture buffer specifications for the coded video sequence. The parameter cpb_dpb_cnt_minus1 plus 1 specifies the number of the alternative specifications for the coded picture buffer and the decoded picture buffer.

bit_rate parameter specifies the maximum input bit rate of the i-th coded picture buffer.

cpb_size parameter specifies the coded picture buffer size of the i-th coded picture buffer.

At least one pair of values of bit_rate and cpt_size shall conform to the maximum bitrate and coded picture buffer size allowed by profile and level.

dpb_size parameter specifies the decoded picture buffer size of the i-th decoded picture buffer.

inital_cpb_removal_delay parameter specifies the delay for the i-th coded picture buffer between the time of arrival in the coded picture buffer of the first bit of the first picture and the time of removal from the coded picture buffer of the first picture.

initial_dpb_output_delay parameter specifies the delay for the i-th decoded picture buffer between the time of arrival in the decoded picture buffer of the first decoded picture and the time of output from the decoded picture buffer of the first decoded picture.

The syntax for the specifications mentioned above can be defined as the following pseudo code:

```
hrd_parameters( ) {
    cpb_dpb_cnt_minus1
    for(i = 0; i <= cpb_dpb_cnt_minus1) {
        bit_rate
        cpb_size
        dpb_size
        initial_cpb_removal_delay
        initial_dpb_output_delay
    }
}
```

The parameters in the above syntax can be signalled in a picture-level header, e.g. supplemental enhancement information (SEI) message or picture header. Alternatively, the parameters can be signalled in a sequence-level header, e.g. sequence header or sequence parameter set.

Figure 4:
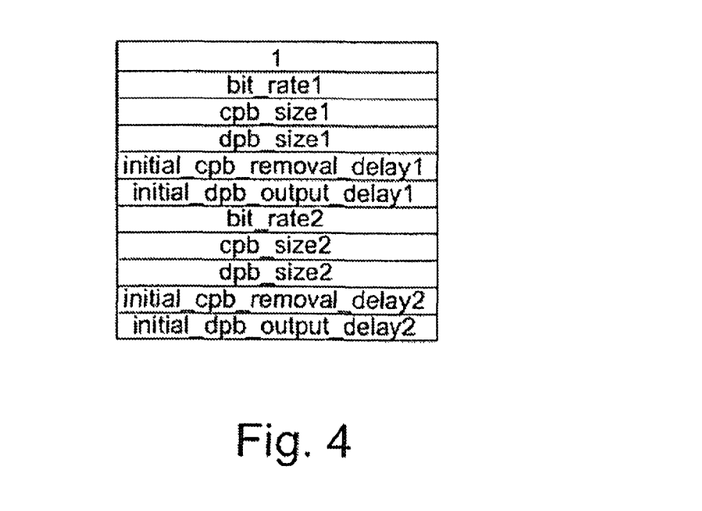
FIG. 4 presents an example of signaling of HRD parameters.

The parameters in the above syntax can be directly signalled as is, or using a method to save signalling bits. For example, both the length representation of the actual value and the actual value are signalled. In FIG. 4 there is depicted a non-restricting example of the signalled parameters. The first parameter indicate that there are two HRD parameter sets in the signal. That parameter is followed by two HRD parameter sets.

The specifications are used by the hypothetical reference decoder 5 of the encoder 1 and they can be signalled to the decoder 2.

Figure 5:
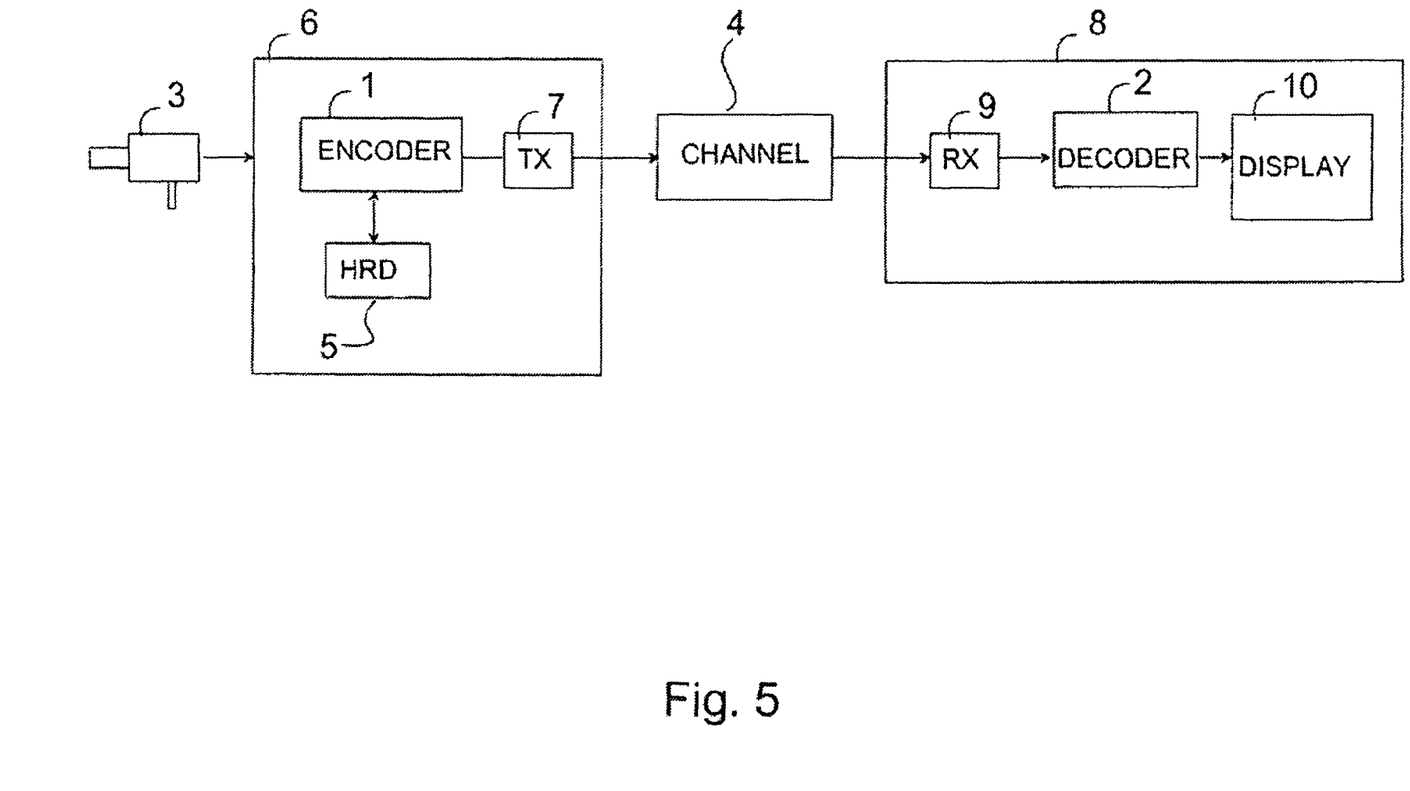
FIG. 5 depicts an example embodiment of the system according to the present invention.
Figure 7:
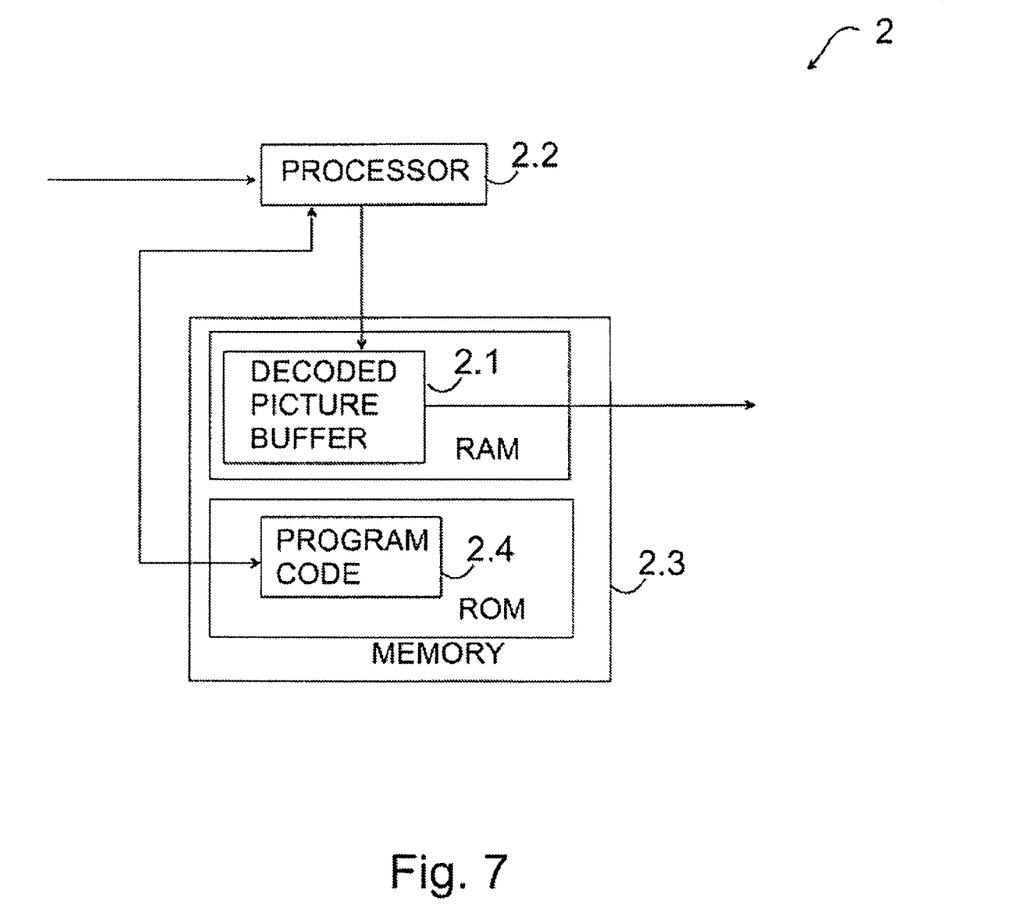
FIG. 7 depicts an example embodiment of the decoder according to the present invention.

In the following the invention will be described in more detail with reference to the system of FIG. 5, the encoder 1 and hypothetical reference decoder (HRD) 5 of FIG. 6 and decoder 2 of FIG. 7. The pictures to be encoded can be, for example, pictures of a video stream from a video source 3, e.g. a camera, a video recorder, etc. The pictures (frames) of the video stream can be divided into smaller portions such as slices. The slices can further be divided into blocks. In the encoder 1 the video stream is encoded to reduce the information to be transmitted via a transmission channel 4, or to a storage media (not shown). Pictures of the video stream are input to the encoder 1. The encoder has an encoding buffer 1.1 (FIG. 6) for temporarily storing some of the pictures to be encoded. The encoder 1 also includes a memory 1.3 and a processor 1.2 in which the encoding tasks according to the invention can be applied. The memory 1.3 and the processor 1.2 can be common with the transmitting device 6 or the transmitting device 6 can have another processor and/or memory (not shown) for other functions of the transmitting device 6.

The encoding process is not necessarily started immediately after the first picture is entered to the encoder, but after a certain amount of pictures are available in the encoding buffer 1.1. Then the encoder 1 tries to find suitable candidates from the pictures to be used as the reference frames. The encoder 1 then performs the encoding to form encoded pictures. The encoded pictures can, for example, be predicted pictures (P), bi-predictive pictures (B), or intra-coded pictures (I). The intra-coded pictures can be decoded without using any other pictures, but other type of pictures need at least one reference picture before they can be decoded. Pictures of any of the above mentioned picture types can be used as a reference picture. Intra-coded pictures can be used as the IDR pictures which start the independently decodable group of pictures. The encoder 1 may perform motion estimation and/or some other tasks to compress the video stream. In motion estimation similarities between the picture to be encoded (the current picture) and a previous and/or latter picture are searched. If similarities are found the compared picture or part of it can be used as a reference picture for the picture to be encoded. In JVT the display order and the decoding order of the pictures are not necessarily the same, wherein the reference picture has to be stored in a buffer (e.g. in the encoding buffer 1.1) as long as it is used as a reference picture. The encoder 1 also inserts information on display order of the pictures into the transmission stream.

From the encoding process the encoded pictures are moved to an coded picture buffer 1.5, if necessary. The encoded pictures are transmitted from the encoder 1 to the decoder 2 via the transmission channel 4. In the decoder 2 the encoded pictures are decoded to form uncompressed pictures corresponding as much as possible to the encoded pictures. Each decoded picture is buffered in the decoded picture buffer 2.1 of the decoder 2 unless it is displayed substantially immediately after the decoding and is not used as a reference picture. Both the reference picture buffering and the display picture buffering may be combined wherein they use the same decoded picture buffer 2.1. This eliminates the need for storing the same pictures in two different places thus reducing the memory requirements of the decoder 2.

The decoder 2 also includes a memory 2.3 and a processor 2.2 in which the decoding tasks according to the invention can be applied. The memory 2.3 and the processor 2.2 can be common with the receiving device 8 or the receiving device 8 can have another processor and/or memory (not shown) for other functions of the receiving device 8. Also the buffer(s) of the decoder 2 can be implemented in the memory 2.3.

The encoder 1 defines the size of the decoded picture buffer 5.2 (DPB size) of the hypothetical reference decoder 5. The initial size may depend on some parameters relating to the video stream (e.g. resolutions colour/BW, etc.). There can also be a maximum size defined for the decoded picture buffer 5.2 (DPBcapacity). The initial size may not necessarily be the same as the maximum size but it can also be smaller than the maximum size. Also the maximum number of reference frames stored in the decoded picture buffer 5.2 of the encoder 1 and, respectively, the decoded picture buffer 2.1 of the decoder 2 is defined.

In the decoder 2 the decoded picture buffer 2.1 has a limited size (DPB size) which in some applications may be varied during the decoding process, if necessary. The initial size of the decoded picture buffer 2.1 may depend on some parameters relating to the video stream (e.g. resolution, colour/BW, etc.). There can also be a maximum size defined for the decoded picture buffer 2.1 (DPBcapacity). The initial size may not necessarily be the same as the maximum size but it can also be smaller than the maximum size. Also the maximum number of reference frames stored in the decoded picture buffer 2.1 is defined.

The transmission and/or storing of the encoded pictures (and the virtual decoding by the hypothetical reference decoder 5) can be started immediately after the first encoded picture is ready. This picture is not necessarily the first one in decoder output order because the decoding order and the output order may not be the same. However, because the size of the decoded picture buffer 2.1 of the decoder 2 is limited it may be necessary to define how long the delay between decoding time of a picture and the display time of the picture can be at maximum, i.e. the maximum number of the pictures to be reordered for displaying. DPB size illustrates how many pictures can be stored in the decoded picture buffer 2.1. It can be calculated by dividing the size of the decoded picture buffer (in bytes) by the size of a picture (in bytes).

When the first picture of the video stream is encoded the transmission can be started. The encoded pictures are stored to the coded picture buffer 1.5. The transmission can also start at a later stage, for example, after a certain part of the video stream is encoded. This delay is indicated by the initial_cpb_removal_delay parameter mentioned above and it is signalled to the decoder 2. Also the hypothetical reference decoder 5 is aware of this parameter.

The decoder 2 should output the decoded pictures in correct order. Also the hypothetical reference decoder 5 should virtually output the decoded pictures in correct order. The operation of the hypothetical reference decoder model was disclosed above in this description. The relative output time was mentioned in the model. The present invention discloses two principles for evaluation of the value of the relative output time.

Figure 1A:
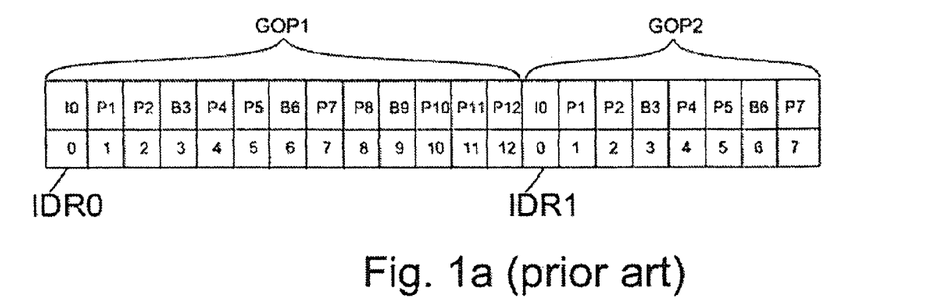
FIG. 1a presents an example of a prior art picture stream in which the pictures are in a display order.
Figure 1B:
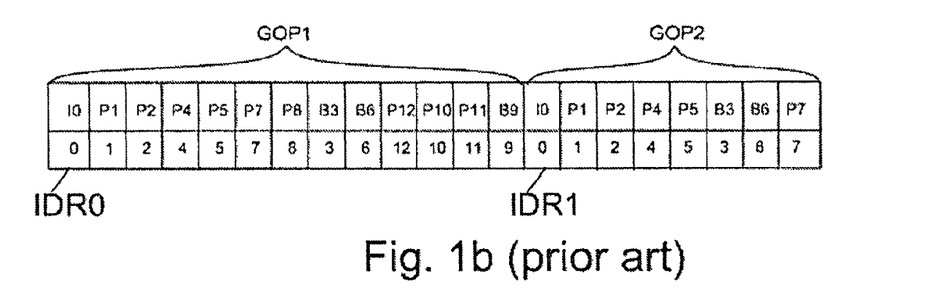
FIG. 1b presents an example of a prior art picture stream in which the pictures are in a decoding order.
Figure 2A:
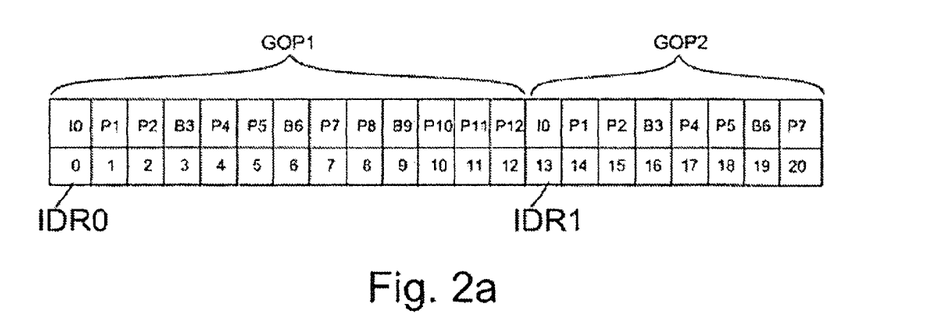
FIG. 2a presents an example of a picture stream according to the present invention in which the pictures are in a display order.
Figure 2B:
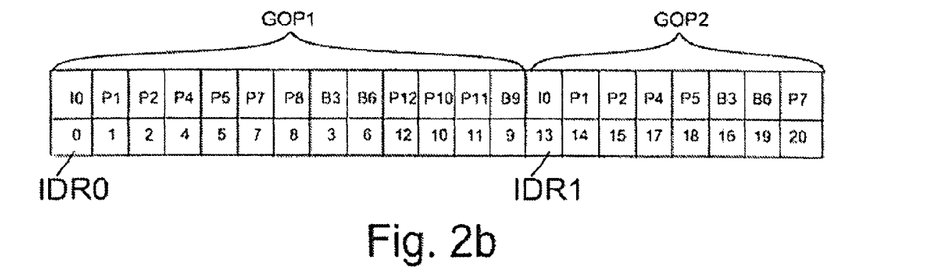
FIG. 2b presents an example of a picture stream according to the present invention in which the pictures are in a decoding order.

According to one embodiment of the invention, the semantics of the syntax element for temporal reference (picture_distance in AVS-M) is changed such that the value of the syntax element continually increases at IDR pictures as if they are non-IDR pictures as is depicted in FIGS. 2a and 2b. In the FIGS. 1a and 1b a prior art video sequence is depicted. In the FIGS. 1a, 1b, 2a and 2b the upper lines illustrate the picture types and the display order and the lower numbers illustrate the temporal references of the pictures. In these examples there are two groups of pictures GOP1, GOP2 each having one IDR picture IDR0, IDR 1 as the first picture and a number of successive pictures. The letter indicates the type of the picture and the number indicates the output/display order of the picture.

The time duration of the temporal reference difference of 1 is also signaled in the bitstream (for example in the sequence parameter set), and the relative output time (ROT) is derived for each picture as follows:

For the first picture the relative output time parameter gets a value 0:

$$ROT(0)=0.$$

For any other picture, the parameter is calculated according to the following equation:

$$ROT(n)=ROT(n-1)+(TR(n)-TR(n-1)+(MaxTR+1))/(MaxTR+1)\times Delta$$

in which ROT(n) is the ROT value of the n-th picture, TR(n) is the temporal reference value of the n-th picture, MaxTR is the maximum value of temporal reference, Delta is the time duration of the temporal reference difference of 1, and/denotes modulo division. In the AVS-M video coding standard, TR(n) is the picture_distance value of the n-th picture.

Figure 3A:
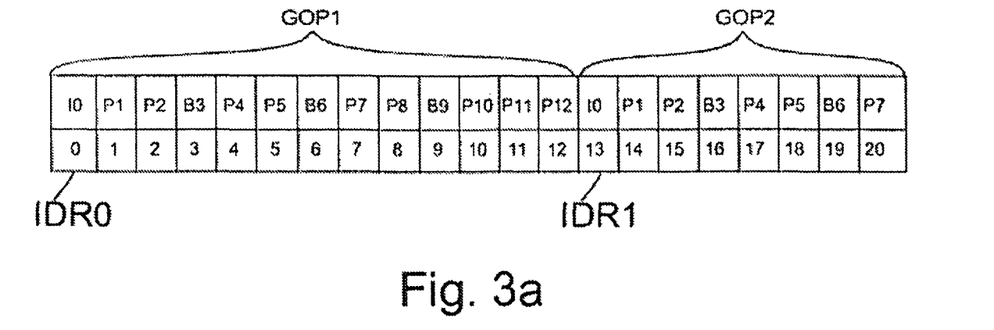
FIG. 3a presents another example of a picture stream according to the present invention in which the pictures are in a display order.
Figure 3B:
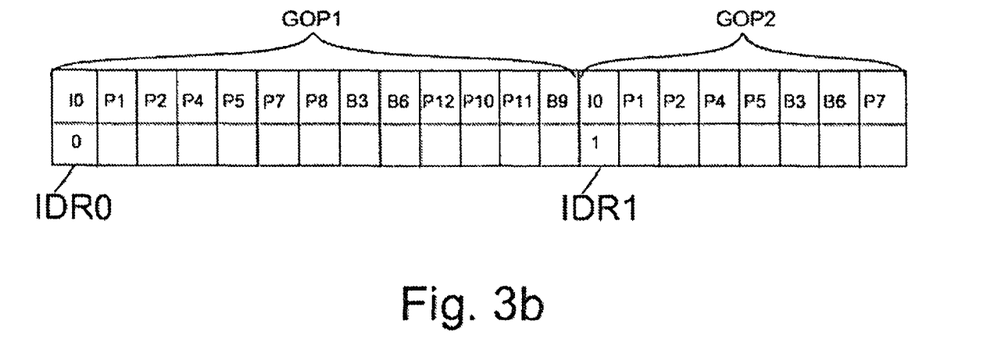
FIG. 3b presents another example of a picture stream according to the present invention in which the pictures are in a decoding order.

According to another embodiment of the invention, the temporal gap between the IDR picture and the previous picture in output/display order (denoted as picture_distance_gap to be used in AVS-M) is signaled in the bitstream for each IDR picture (for example in the picture header) as is illustrated in FIG. 3b. In FIG. 5a the video sequence and the output/display order of the pictures of the video sequence are depicted.

The time duration of the temporal reference difference of 1 is also signaled in the bitstream (for example in the sequence parameter set), and the relative output time (ROT) mentioned above is derived for each picture as follows:

For the first picture, the relative output time parameter gets a value 0:

$$ROT(0)=0.$$

For any other non-IDR picture, the parameter is calculated according to the following equation:

$$ROT(n)=ROT(n-1)+(TR(n)+TR(n-1)+(MaxTR+1))/(MaxTR+1)\times Delta$$

in which ROT(n) is the ROT value of the n-th picture, TR(n) is the temporal reference value of the n-th picture, MaxTR is the maximum value of temporal reference, Delta is the time duration of the temporal reference difference of 1, and/denotes modulo division. In the AVS-M video coding standard, TR(n) is the picture_distance value of the n-th picture.

For any other IDR picture, the parameter is calculated according to the following equation:

$$ROT(n)=ROT(n-1)+TRgap\times Delta$$

in which ROT(n) is the ROT value of the IDR picture. ROT (n−1) is the ROT value of the previous picture in output/display order, TRgap is the temporal gap between the IDR picture and the previous picture in output/display order (denoted as picture_distance_gap to be used in AVS-M).

As was mentioned above, a number of one or more than one set of HRD parameters can be signaled for each coded video sequence. Each set of HRD parameters characterizes an HRD operation point.

The invention enables a simple HRD with multiple HRD operation points and decoded picture buffer operations for video coding standards.

If the first embodiment of the invention is implemented and if video editing operation such as insertion or removal of coded video sequences to/from a bitstream is done, the temporal reference (picture_distance in AVS-M) needs to be updated for each picture in some coded video sequences.

If the second embodiment of the invention is implemented and if video editing operation such as insertion or removal of coded video sequences to/from a bitstream is done, the temporal reference (picture_distance in AVS-M) does not need to be updated for any picture. Instead, only the temporal gap (denoted as picture_distance_gap to be used in AVS-M) value of the one or two IDR pictures whose preceding picture in output/display order has been changed need to be updated.

Next, the operation of the decoder 2 according to an embodiment of the present invention will be described. The decoded picture buffer 2.1 contains memory places for storing a number of pictures. Those places are also called as frame stores in this description.

The decoder 2 starts to decode the encoded pictures beginning from the picture that first enters the coded picture buffer. When the picture is decoded it will be stored to the additional frame store or the decoded picture buffer. The picture to be decoded can either be a frame or a field. The output/display of the decoded pictures is performed on the basis of the relative output time parameter ROT.

The HRD 5 is used with the encoder 1 to virtually perform the decoding of the encoded pictures similarly than the decoder 2 does. The encoded picture buffer 1.5 can be used as a pre-decoding buffer for a HRD 5. One aim of the virtual decoding in the HRD 5 is to eliminate a risk for decoding errors due to unbalanced encoding/decoding tasks. Also in the HRD 5 both the reference picture buffering and the display picture buffering can be combined and they can use the same decoded picture buffer 5.2 thus reducing the memory requirements of the encoder 1. All decoded pictures stay in the unified decoded picture buffer until they are no longer used as reference pictures and until their (virtual) display time or relative output time is reached. The term virtual refers to the fact that in the HRD 5 of the encoder 1, in which the decoding is performed, the decoded pictures are not outputted/displayed but the HRD 5 only checks if there could be errors in the decoding process of the decoder 2 due to, for example, too small buffer size. If errors exist the HRD 5 can inform the encoder to change some encoding parameters, or the size of the decoded picture buffer 2.1 of the decoder 1 can be increased, for example: by sending a SEI (Supplemental Enhancement Information) message to the decoder 1 in some implementations (unless the maximum size of the decoded picture buffer 5.2, 2.1 is already in use).

The decoding can be simultaneous operation with encoding, or the encoder first creates the bitstream, and when the bitstream is ready, it will be input to HRD 5 for checking that the bitstream fulfils the HRD 5 and processing level requirements. The HRD may also create and modify some HRD parameters, such as the initial buffering delay in coded picture buffer, according to the characteristics of the coded stream.

The hypothetical reference decoder 5 can further comprise an output for providing the HRD parameters for decoding the bitstream. The parameters can be provided e.g. with the bitstream comprising the encoded pictures or as a separate information, for example as a signaling bit stream, a file format container etc.

The hypothetical reference decoder 5 can also be used as a bitstream analyzer to analyze whether the encoded bitstream is compliant to a standard in which format the bitstream is. Therefore, if the hypothetical reference decoder 5 detects that the bitstream is not compliant with the standard according to which the bitstream is encoded, the hypothetical reference decoder 5 may indicate it to an encoder or other device where the signal is coming from.

The present invention can also be implemented as a part of a transcoder (not shown) which selects one or more encoding parameters and transcodes a bitstream using the selected parameters. Transcoding may be done by decoding first and then encoding, for example.

The present invention can be applied in many kind of systems and devices. The transmitting device 6 including the encoder 1 and the HRD 5 advantageously include also a transmitter 7 to transmit the encoded pictures to the transmission channel 4. The receiving device 8 include the decoder 2, a receiver 9 to receive the encoded pictures, and a display 10 on which the decoded pictures can be displayed. The transmission channel can be for example, a landline communication channel and/or a wireless communication channel. The transmitting device and the receiving device include also one or more processors 1.2, 2.2 which can perform the necessary steps for controlling the encoding/decoding process of video stream according to the invention. Therefore, the method according to the present invention can mainly be implemented as machine executable steps of the processors. The buffering of the pictures can be implemented in the memory 1.3, 2.3 of the devices. The program code 1.4 of the encoder can be stored into the memory 1.3. Respectively, the program code 2.4 of the decoder can be stored into the memory 2.3.

It is also possible that the encoded picture stream is not transmitted to the receiving device but it can be stored to a storage medium from where it can be retrieved for transmission and/or decoding.

What is claimed is:

1. An encoder comprising
    an input for inputting video signal to be encoded to form an encoded video signal comprising pictures of a first coded video sequence and a second coded video sequence;
    an encoded picture buffer;
    a decoded picture buffer;
    a definer for defining at least one parameter indicative of the temporal reference between the last picture of said first coded video sequence and the first picture of said second coded video sequence, wherein said at least one parameter is signaled in the encoded video signal, and wherein said at least one parameter comprises a parameter indicative of the time duration of a temporal reference difference of one, and
    a second definer for determining a relative output time for the first picture of said second coded video sequence according to a relative output time of a previous picture together with a temporal gap between the first picture of said second coded video sequence and the previous picture.

2. The encoder according to claim 1, further comprising a hypothetical decoder for hypothetically decoding encoded video signal.

3. The encoder according to claim 2, said hypothetical decoder being adapted to inform the encoder to change at least one encoding parameter.

4. The encoder according to claim 2, said hypothetical decoder being adapted to inform to change the size of a decoded picture buffer of a decoder.

5. An apparatus, comprising:
    a processor; and
    a memory including computer program code, the memory and the computer program code configured to, with the processor, cause the apparatus at least to process an encoded video signal comprising:
        pictures of a first coded video sequence and a second coded video sequence;
        at least one parameter indicative of the temporal reference between the last picture of said first coded video sequence and the first picture of said second coded video sequence, wherein said at least one parameter is encoded in said video signal, and wherein said at least one parameter comprises a parameter indicative of the time duration of a temporal reference difference of one; and
        at least one parameter indicative of a relative output time for the first picture of said second coded video sequence, the relative output time being a relative output time of a previous picture together with a temporal gap between the first picture of said second coded video sequence and the previous picture.

6. The apparatus according to claim 5, wherein said encoded video signal comprises information for a decoder to change the size of a decoded picture buffer of the decoder.

7. A decoder comprising
    an input for inputting encoded video signal to be decoded, said encoded video signal comprising
        pictures of a first coded video sequence and a second coded video sequence;
        at least one parameter indicative of the temporal reference between the last picture of said first coded video sequence and the first picture of said second coded video sequence; and
        at least one parameter indicative of a relative output time for the first picture of said second coded video sequence,
    a decoded picture buffer; and
    means for parsing information received in the encoded video signal to obtain said at least one parameter and said relative output time parameter,
    wherein said at least parameter comprises a parameter indicative of the time duration of a temporal reference difference of one, and
    wherein said at least one parameter indicative of the relative output time for the first picture of said second coded video sequence is a relative output time of a previous picture together with a temporal gap between the first picture of said second coded video sequence and the previous picture.

8. The decoder according to claim 7, wherein the decoder is adapted to use said at least one parameter in at least one of the following:
   decoding the encoded video stream;
   outputting decoded video pictures; or
   displaying decoded video pictures.

9. A method comprising
   receiving a video signal to be encoded to an encoder to form an encoded video signal comprising pictures of a first coded video sequence and a second coded video sequence;
   said encoder defining at least one parameter indicative of the temporal reference between the last picture of said first coded video sequence and the first picture of said second coded video sequence, wherein said at least one parameter is signaled in the encoded video signal by said encoder, and wherein said at least one parameter comprises a parameter indicative of the time duration of a temporal reference difference of one, and
   determining a relative output time for the first picture of said second coded video sequence according to a relative output time of a previous picture together with a temporal gap between the first picture of said second coded video sequence and the previous picture.

10. The method according to claim 9, further comprising said encoder hypothetically decoding encoded video signal.

11. The method according to claim 10, wherein said hypothetically decoding comprises informing the encoder to change at least one encoding parameter.

12. The method according to claim 10, wherein said hypothetically decoding comprises informing a decoder to change the size of a decoded picture buffer of the decoder.

13. A system comprising
   an encoder comprising
      an input for inputting video signal to be encoded to form an encoded video signal comprising pictures of a first coded video sequence and a second coded video sequence;
      an encoded picture buffer;
      a decoded picture buffer; and
      a definer for defining at least one parameter indicative of the temporal reference between the last picture of said first coded video sequence and the first picture of said second coded video sequence, wherein said at least one parameter is signaled in the encoded video signal, and wherein said at least one parameter comprises a parameter indicative of the time duration of a temporal reference difference of one; and
   a second definer for determining a relative output time for the first picture of said second coded video sequence according to a relative output time of a previous picture together with a temporal gap between the first picture of said second coded video sequence and the previous picture;
   a decoder comprising
      an input for inputting said encoded video signal to be decoded;
      a decoded picture buffer; and
      means for parsing information received in the encoded video signal to obtain said at least one parameter.

14. The system according to claim 13, said encoder further comprising a hypothetical decoder for hypothetically decoding encoded video signal.

15. The system according to claim 14, said hypothetical decoder being adapted to inform the encoder to change at least one encoding parameter.

16. The system according to claim 14, said hypothetical decoder being adapted to inform to change the size of a decoded picture buffer of a decoder.

17. A non-transitory computer program product comprising machine executable instructions for
   receiving a video signal to be encoded to form an encoded video signal comprising pictures of a first coded video sequence and a second coded video sequence;
   defining at least one parameter indicative of the temporal reference between the last picture of said first coded video sequence and the first picture of said second coded video sequence;
   determining a relative output time for the first picture of said second coded video sequence according to a relative output time of a previous picture together with a temporal gap between the first picture of said second coded video sequence and the previous picture; and
   signaling said at least one parameter in the encoded video stream, wherein said at least one parameter comprises a parameter indicative of the time duration of a temporal reference difference of one.

18. A non-transitory medium for carrying a bitstream comprising
   an encoded video signal comprising pictures of a first coded video sequence and a second coded video sequence;
   at least one parameter indicative of the temporal reference between the last picture of said first coded video sequence and the first picture of said second coded video sequence; and
   at least one parameter indicative of a relative output time for the first picture of said second coded video sequence,
   wherein said at least one parameter comprises a parameter indicative of the time duration of a temporal reference difference of one, and
   wherein the relative output time for the first picture of said second coded video sequence is a relative output time of a previous picture together with a temporal gap between the first picture of said second coded video sequence and the previous picture.

* * * * *

UNITED STATES PATENT AND TRADEMARK OFFICE
CERTIFICATE OF CORRECTION

PATENT NO. : 8,638,847 B2  
APPLICATION NO. : 11/720973  
DATED : January 28, 2014  
INVENTOR(S) : Ye-Kui Wang Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1289 days.

Signed and Sealed this
Twenty-second Day of September, 2015

Michelle K. Lee
*Director of the United States Patent and Trademark Office*